United States Patent
Ray et al.

(10) Patent No.: US 10,310,114 B2
(45) Date of Patent: Jun. 4, 2019

(54) IDENTIFYING AN ERROR BOUND OF A STIMULATED RESERVOIR VOLUME OF A SUBTERRANEAN REGION

(71) Applicant: Halliburton Energy Services, Inc., Houston, TX (US)

(72) Inventors: Baidurja Ray, Houston, TX (US); Avi Lin, Houston, TX (US); Jianfu Ma, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 82 days.

(21) Appl. No.: 15/304,990

(22) PCT Filed: May 19, 2014

(86) PCT No.: PCT/US2014/038634
§ 371 (c)(1),
(2) Date: Oct. 18, 2016

(87) PCT Pub. No.: WO2015/178885
PCT Pub. Date: Nov. 26, 2015

(65) Prior Publication Data
US 2017/0139066 A1    May 18, 2017

(51) Int. Cl.
*G06F 11/30*  (2006.01)
*G01V 1/28*   (2006.01)
(Continued)

(52) U.S. Cl.
CPC .............. *G01V 1/288* (2013.01); *G01V 1/42* (2013.01); *G01V 1/34* (2013.01); *G01V 2210/1232* (2013.01); *G01V 2210/1234* (2013.01); *G01V 2210/646* (2013.01); *G01V 2210/65* (2013.01); *G01V 2210/667* (2013.01)

(58) Field of Classification Search
CPC ...................................................... G01V 1/288
See application file for complete search history.

(56) References Cited

U.S. PATENT DOCUMENTS

2007/0272407 A1    11/2007 Lehman et al.
2013/0081805 A1*   4/2013 Bradford .................. G01V 1/40
                                                                    166/250.1
(Continued)

FOREIGN PATENT DOCUMENTS

WO    2015178885 A1    11/2015

OTHER PUBLICATIONS

Graham, R. L., "An Efficient Algorith for Determining the Convex Hull of a Finite Planar Set," Information Processing Letters 1, Jan. 28, 1972, North-Holland Publishing Company, 2 pages.
(Continued)

*Primary Examiner* — Phuong Huynh
(74) *Attorney, Agent, or Firm* — John W. Wustenberg; Parker Justiss, P.C.

(57) ABSTRACT

In some aspects, a closed boundary is computed based on locations and location-uncertainty domains of microseismic events associated with a stimulation treatment of a subterranean region. The closed boundary encloses the locations and respective location-uncertainty domains of multiple microseismic event data points. An error bound of a stimulated reservoir volume (SRV) for the stimulation treatment is identified based on the closed boundary.

19 Claims, 8 Drawing Sheets

(51) Int. Cl.
*G01V 1/42* (2006.01)
*G01V 1/34* (2006.01)

(56) References Cited

U.S. PATENT DOCUMENTS

2013/0144532 A1  6/2013  Williams et al.
2013/0231910 A1  9/2013  Kumar et al.
2013/0304437 A1  11/2013  Ma et al.

OTHER PUBLICATIONS

Jarvis, R. A., "On the Identification of the Convex Hull of a Finite Set of Points in the Plane," Information Processing Letters 2, Dec. 6, 1972, North-Holland Publishing Company, 4 pages.
Rappaport, D., "A convex hull algorithm for discs, and applications," Computational Geometry: Theory and Applications 1, 1992, Elsevier Science Publishers, pp. 171-187.
Devillers, O., et al., "Incremental Algorithms for Finding the Convex Hulls of Circles and the Lower Envelopes of Parabolas," 1995, Information Processing Letters 56, 9 pages.
Boissonnat, J-D, et al., "An algorithm for constructing the convex hull of a set of spheres in dimension d," Computational Geometry 6, 1996, Elsevier Science B.V., 8 pages.
Chan, T.M., "Optimal Output-Sensitive Convex Hull Algorithms in Two and Three Dimensions," Discrete & Computational Geometry 16, 1996, Springer, 8 pages.
Kettner, L., et al_, "Classroom Examples of Robustness Problems in Geometric Computations," Computational Geometry 40, Apr. 12, 2006, 25 pages.
Zimmer, U., "Calculating Stimulated Reservoir Volume (SRV) with Consideration of Uncertainties in Microseismic-Event Locations," CSUG/SPE 148610, Canadian Society for Unconventional Gas, 2011, 13 pages.
Tang, M., et al., "GPU accelerated Convex Hull Computation," Computer & Graphics 36, Apr. 9, 2012, 10 pages.

* cited by examiner

IDENTIFYING AN ERROR BOUND OF A STIMULATED RESERVOIR VOLUME OF A SUBTERRANEAN REGION

CROSS-REFERENCE TO RELATED APPLICATION

This application is the National Stage of, and therefore claims the benefit of, International Application No. PCT/US2014/038634 filed on May 19, 2014, entitled "IDENTIFYING AN ERROR BOUND OF A STIMULATED RESERVOIR VOLUME OF A SUBTERRANEAN REGION," which was published in English under International Publication Number WO 2015/178885 on Nov. 26, 2015. The above application is commonly assigned with this National Stage application and is incorporated herein by reference in its entirety.

BACKGROUND

The following description relates to identifying an error bound of a computed stimulated reservoir volume (SRV) for a stimulation treatment of a subterranean region, based on microseismic data.

Microseismic data are often acquired in association with injection treatments applied to a subterranean formation. In a typical injection treatment, fluids are injected in a subterranean formation at high pressure to induce fractures in the subterranean formation. The injection treatments are typically applied to enhance hydrocarbon productivity of the subterranean formation. The stresses induced by the pressures generated by the stimulation treatment can generate low-amplitude or low-energy seismic events in the subterranean formation, and the events can be detected by sensors and collected for analysis.

DESCRIPTION OF DRAWINGS

Like reference symbols in the various drawings indicate like elements.

DETAILED DESCRIPTION

Figure 1A:
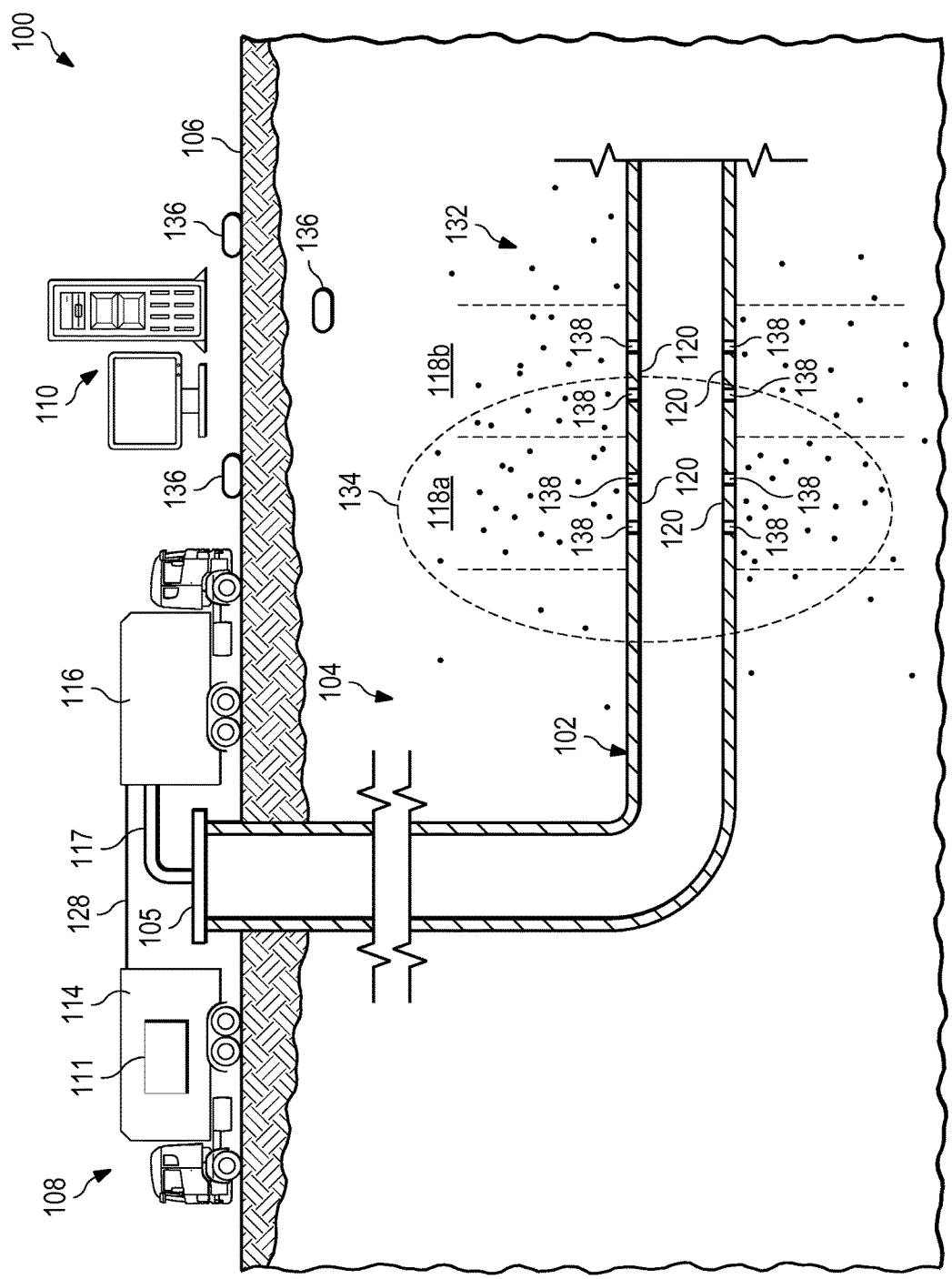
FIG. 1A is a schematic diagram of an example well system.

In some aspects, example techniques for identifying a boundary of a set of geometrical objects are described. The geometrical objects can include, for example, planar circles, spheres, ellipsoids, or other convex shaped objects. In some implementations, the boundary can be a closed boundary that encloses the set of geometrical objects. The boundary can have any type of shape depending upon the shape of the objects in the set. For example, the boundary can be a convex shape having straight boundary sections, curved boundary sections, or both. In some cases, the boundary can include concave sections.

In some aspects, techniques for identifying a convex shape as the boundary of a set of planar circles are described. In some instances, the convex shape can be the smallest convex curve that encloses all the circles. The example techniques can include, for example, reading data of the circles and user preferences (e.g., on the desired computational precision, the desired response time, etc.); computing direct common tangents (DCTs) for each pair of circles; computing a convex hull of DCT points; and computing the convex shape and determining its properties.

In some implementations, the example techniques can be applied to account for the uncertainty in microseismic event data generated by a stimulation treatment (e.g., an injection treatment, a flow-back treatment, etc.) applied on a subterranean region, and to provide an error bound, for example, of a stimulated reservoir volume (SRV) for the stimulation treatment computed based on microseismic event data; the uncertainty can include uncertainty related to precision- or accuracy-related limitations of measuring equipment or data processing, errors generated by measuring equipment, or uncertainty from other sources. In some examples, each of the geometrical objects (e.g., circles, spheres, etc.) can represent a location-uncertainty domain of a microseismic event data point. The boundary of the set of geometrical objects can represent, for example, a tight bound on the maximum positive error of the SRV computed based on microseismic event data.

The techniques described herein include algorithms for identifying the boundary, and example implementations of the algorithms are described. In some instances, the example algorithms described herein can be efficiently implemented, and the example algorithms can achieve efficient performance and robust programming. In some implementations, the example algorithms can be implemented in multiple modules (or sub-algorithms) and thus can be flexible to account for user preferences as inputs to its sub-algorithms. Some example techniques can correctly treat any data degeneracy (e.g., by explicitly treating the degeneracy), while being responsive to user preferences. As such, some of the example techniques can be used to handle any arbitrary data set "as-is," without having to resort to additional complex data processing. The example algorithms can be robust and can accommodate user preference of precision over run-time, and vice-versa. In some implementations, the example algorithms can achieve improved or optimal run-time.

In some instances, the techniques described here can provide field engineers or others with an effective and efficient tool for reliability and sensitivity analysis of the microseismicity-based SRV (e.g., SRV computed based on microseismic event data). The information obtained based on the techniques described can be used to assess treatment field development, to evaluate the efficiency of hydraulic fracturing treatments, to modify or otherwise manage a treatment plan, or to perform other types of analysis or design. The example techniques can achieve additional or different advantages.

FIG. 1A is a diagram of an example well system 100 with a computing subsystem 110. The example well system 100 includes a wellbore 102 in a subterranean region 104 beneath the ground surface 106. The example wellbore 102 shown in FIG. 1A includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations of low permeability rock (e.g., shale, coal, or others).

The example well system 100 shown in FIG. 1A includes an injection system 108. The injection system 108 can be used to perform a stimulation treatment that includes, for example, an injection treatment and a flow back treatment. During an injection treatment, fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

A fracture treatment can be applied at a single fluid injection location or at multiple fluid injection locations in a subterranean region, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or any suitable combination of these and others.

The example injection system 108 can inject treatment fluid into the subterranean region 104 from the wellbore 102. The injection system 108 includes instrument trucks 114, pump trucks 116, and an injection treatment control subsystem 111. The example injection system 108 may include other features not shown in the figures. The injection system 108 may apply injection treatments that include, for example, a single-stage injection treatment, a multi-stage injection treatment, a mini-fracture test treatment, a follow-on fracture treatment, a re-fracture treatment, a final fracture treatment, other types of fracture treatments, or a combination of these.

The example injection system 108 in FIG. 1A uses multiple treatment stages or intervals 118*a* and 118*b* (collectively "stages 118"). The injection system 108 may delineate fewer stages or multiple additional stages beyond the two example stages 118 shown in FIG. 1A. The stages 118 may each have one or more perforation clusters 120. A perforation cluster can include one or more perforations 138. Fractures in the subterranean region 104 can be initiated at or near the perforation clusters 120 or elsewhere. The stages 118 may have different widths, or the stages 118 may be uniformly distributed along the wellbore 102. The stages 118 can be distinct, non-overlapping (or overlapping) injection zones along the wellbore 102. In some instances, each of the multiple treatment stages 118 can be isolated, for example, by packers or other types of seals in the wellbore 102. In some instances, each of the stages 118 can be treated individually, for example, in series along the extent of the wellbore 102. The injection system 108 can perform identical, similar, or different injection treatments at different stages.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1A can supply treatment fluid or other materials for the injection treatment. The pump trucks 116 may contain multiple different treatment fluids, proppant materials, or other materials for different stages of a stimulation treatment.

The example pump trucks 116 can communicate treatment fluids into the wellbore 102, for example, through a conduit, at or near the level of the ground surface 106. The treatment fluids can be communicated through the wellbore 102 from the ground surface 106 level by a conduit installed in the wellbore 102. The conduit may include casing cemented to the wall of the wellbore 102. In some implementations, all or a portion of the wellbore 102 may be left open, without casing. The conduit may include a working string, coiled tubing, sectioned pipe, or other types of conduit.

The instrument trucks 114 can include mobile vehicles, immobile installations, or other suitable structures. The example instrument trucks 114 shown in FIG. 1A include an injection treatment control subsystem 111 that controls or monitors the stimulation treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment.

The example injection treatment control subsystem 111 shown in FIG. 1A controls operation of the injection system 108. The injection treatment control subsystem 111 may include data processing equipment, communication equipment, or other systems that control stimulation treatments applied to the subterranean region 104 through the wellbore 102. The injection treatment control subsystem 111 may include or be communicably linked to a computing system (e.g., the computing subsystem 110) that can calculate, select, or optimize fracture treatment parameters for initialization, propagation, or opening fractures in the subterranean region 104. The injection treatment control subsystem 111 may receive, generate or modify a stimulation treatment plan (e.g., a pumping schedule) that specifies properties of a stimulation treatment to be applied to the subterranean region 104.

The stimulation treatment, as well as other activities and natural phenomena, can generate microseismic events in the subterranean region 104. In the example shown in FIG. 1A, the injection system 108 has caused multiple microseismic events 132 during a multi-stage injection treatment. A subset 134 of microseismic events are shown inside a circle. In some implementations, the subset 134 of microseismic events are events associated with a single treatment stage (e.g., treatment stage 118a) of a multi-stage injection treatment. In some implementations, the subset 134 of microseismic events can be identified based on the time that they occurred, and the subset 134 can be filtered or otherwise modified to exclude outliers or other event points. The subset 134 of microseismic events can be selected from a superset of microseismic events based on any suitable criteria. In some cases, the subset 134 of microseismic events are used to identify an SRV for the stage 118a, an error bound of the SRV for the stage 118a, or another aspect of an injection treatment.

The microseismic event data can be collected from the subterranean region 104. For example, the microseismic data can be collected by one or more sensors 136 associated with the injection system 108, or the microseismic data can be collected by other types of systems. The microseismic information detected in the well system 100 can include acoustic signals generated by natural phenomena, acoustic signals associated with a stimulation treatment applied through the wellbore 102, or other types of signals. For instance, the sensors may detect acoustic signals generated by rock slips, rock movements, rock fractures or other events in the subterranean region 104. In some instances, the locations of individual microseismic events can be determined based on the microseismic data. Microseismic events in the subterranean region 104 may occur, for example, along or near induced hydraulic fractures. The microseismic events may be associated with pre-existing natural fractures or hydraulic fracture planes induced by fracturing activities.

The wellbore 102 shown in FIG. 1A can include sensors 136, microseismic array, and other equipment that can be used to detect microseismic information. The sensors 136 may include geophones or other types of listening equipment. The sensors 136 can be located at a variety of positions in the well system 100. In FIG. 1A, sensors 136 are installed at the surface 106 and beneath the surface 106 (e.g., in an observation well (not shown)). Additionally or alternatively, sensors may be positioned in other locations above or below the surface 106, in other locations within the wellbore 102, or within another wellbore (e.g., another treatment well or an observation well). The wellbore 102 may include additional equipment (e.g., working string, packers, casing, or other equipment) not shown in FIG. 1A.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, the sensors 136 may communicate with the instrument trucks 114 or the computing subsystem 110 through wired or wireless links or networks, or the instrument trucks 114 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a stimulation treatment of a subterranean region 104. Microseismic data from a stimulation treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 136. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data, for example, by a wired or wireless communication link, by a wired or wireless network, or by one or more disks or other tangible media.

In some instances, the computing subsystem 110 can perform fracture mapping based on collected microseismic event data to identify fracture orientation trends and extract fracture network characteristics. The characteristics may include fracture orientation (e.g., azimuth and dip angle), fracture size (e.g., length, height, surface area), fracture spacing, fracture complexity, stimulated reservoir volume (SRV), or another property. In some implementations, the computing subsystem 110 can identify SRV for a stimulation treatment applied to the subterranean region 104, calculate an uncertainty or an error bound of the SRV calculation of a stimulation treatment, or other information. The computing subsystem 110 can perform additional or different operations.

In one aspect of operation, the injection system 108 can perform an injection treatment, for example, by injecting fluid into the subterranean region 104 through the wellbore 102. The injection treatment can be, for example, a multi-stage injection treatment where an individual injection treatment is performed during each stage. The injection treatment can induce microseismic events in the subterranean region 104. Sensors (e.g., the sensors 136) or other detecting equipment in the well system 100 can detect the microseismic events, and collect and transmit the microseismic event data, for example, to the computing subsystem 110. The computing subsystem 110 can receive and analyze the microseismic event data. For instance, the computing subsystem 110 may identify an SRV and an error bound of the computed SRV for the injection treatment based on the microseismic data. The SRV data may be computed for an individual stage or for the multi-stage treatment as a whole. In some instances, the computed SRV data can be presented to well operators, field engineers, or others to visualize and analyze the temporal and spatial evolution and the error bound of the SRV. In some implementations, the microseismic event data can be collected, communicated, and analyzed in real time during an injection treatment. In some implementations, the computed SRV data can be provided to the injection treatment control subsystem 111. A current or a prospective treatment strategy can be adjusted or otherwise managed based on the computed SRV data, for example, to improve the efficiency of the injection treatment.

Some of the techniques and operations described here may be implemented by a computing subsystem configured to provide the functionality described. In various embodiments, a computing system may include any of various types of devices, including, but not limited to, personal computer systems, desktop computers, laptops, notebooks, mainframe computer systems, handheld computers, workstations, tablets, application servers, storage devices, computing clusters, or any type of computing or electronic device.

Figure 1B:
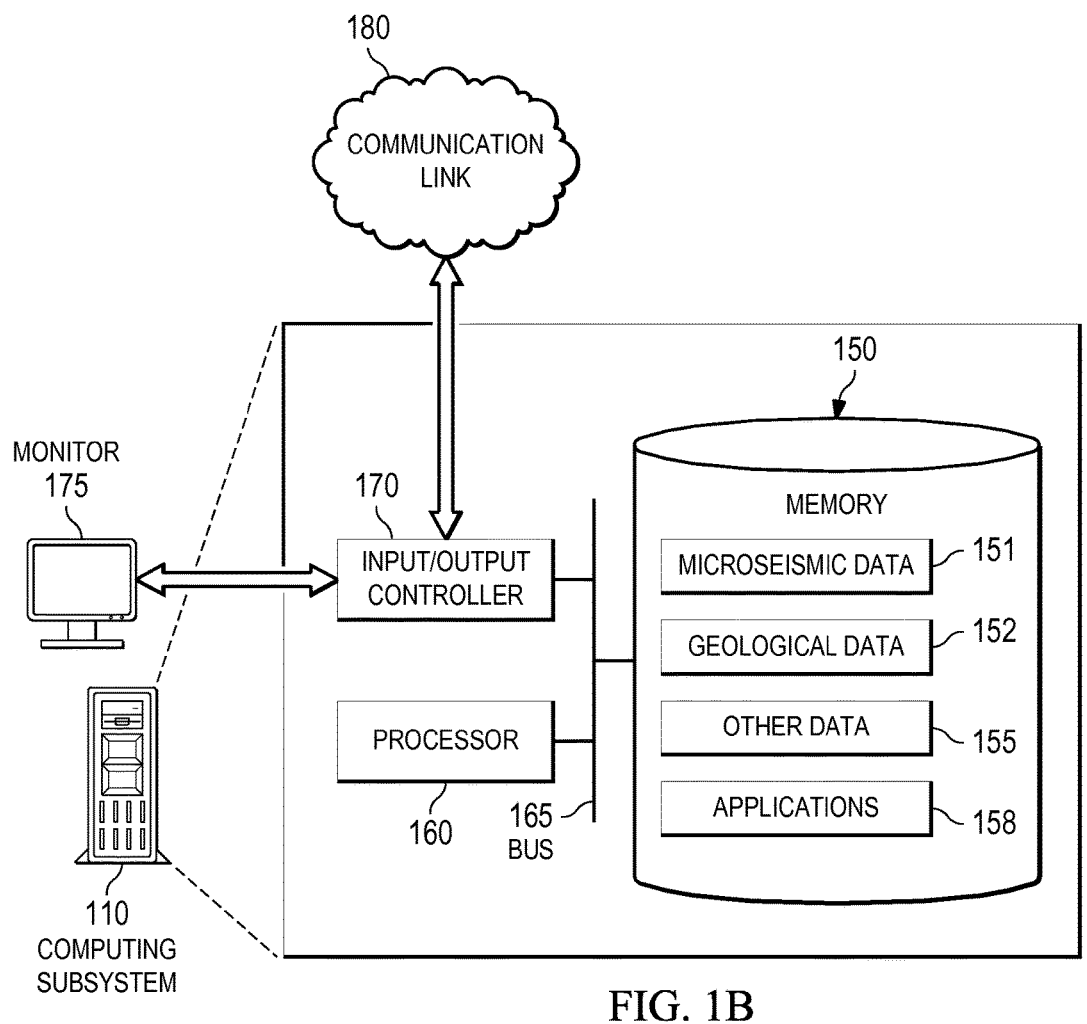
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a memory 150, a processor 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, other data 155, and applications 158. In some implementations, a memory of a computing device includes additional or different data, applications, models, or other information.

The microseismic data 151 can include information on microseismic events in a subterranean area. For example, the microseismic data 151 can include information based on acoustic data detected at the wellbore 102, at the surface 106, or at other locations. The microseismic data 151 can include information collected by sensors 136. In some cases, the microseismic data 151 includes information that has been combined with other data, reformatted, or otherwise processed. The microseismic event data may include any suitable information relating to microseismic events (e.g., locations, times, magnitudes, moments, uncertainties, etc.). The microseismic event data can include data collected from one or more stimulation treatments, which may include data collected before, during, or after a fluid injection.

The geological data 152 can include information on the geological properties of the subterranean zone 104. For example, the geological data 152 may include information on the wellbore 102, or information on other attributes of the subterranean region 104. In some cases, the geological data 152 includes information on the lithology, fluid content, stress profile, pressure profile, spatial extent, or other attributes of one or more rock formations in the subterranean area. The geological data 152 can include information collected from well logs, rock samples, outcroppings, microseismic imaging, or other data sources.

The applications 158 can include software applications, scripts, programs, functions, executables, or other modules that are interpreted or executed by the processor 160. The applications 158 may include machine-readable instructions for performing one or more of the operations related to FIGS. 2-7. The applications 158 may include machine-readable instructions for generating a user interface or a plot, for example, illustrating fracture geometry (e.g., length, width, spacing, orientation, etc.), geometric representations of SRV, SRV overlap, SRV uncertainty, etc. The applications 158 can obtain input data, such as treatment data, geological data, microseismic data, or other types of input data, from the memory 150, from another local source, or from one or more remote sources (e.g., via the communication link 180). The applications 158 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 158 by executing or interpreting the software, scripts, programs, functions, executables, or other modules contained in the applications 158. The processor 160 may perform one or more of the operations related to FIGS. 2-7. The input data received by the processor 160 or the output data generated by the processor 160 can include any of the microseismic data 151, the geological data 152, or the other data 155.

Figure 2:
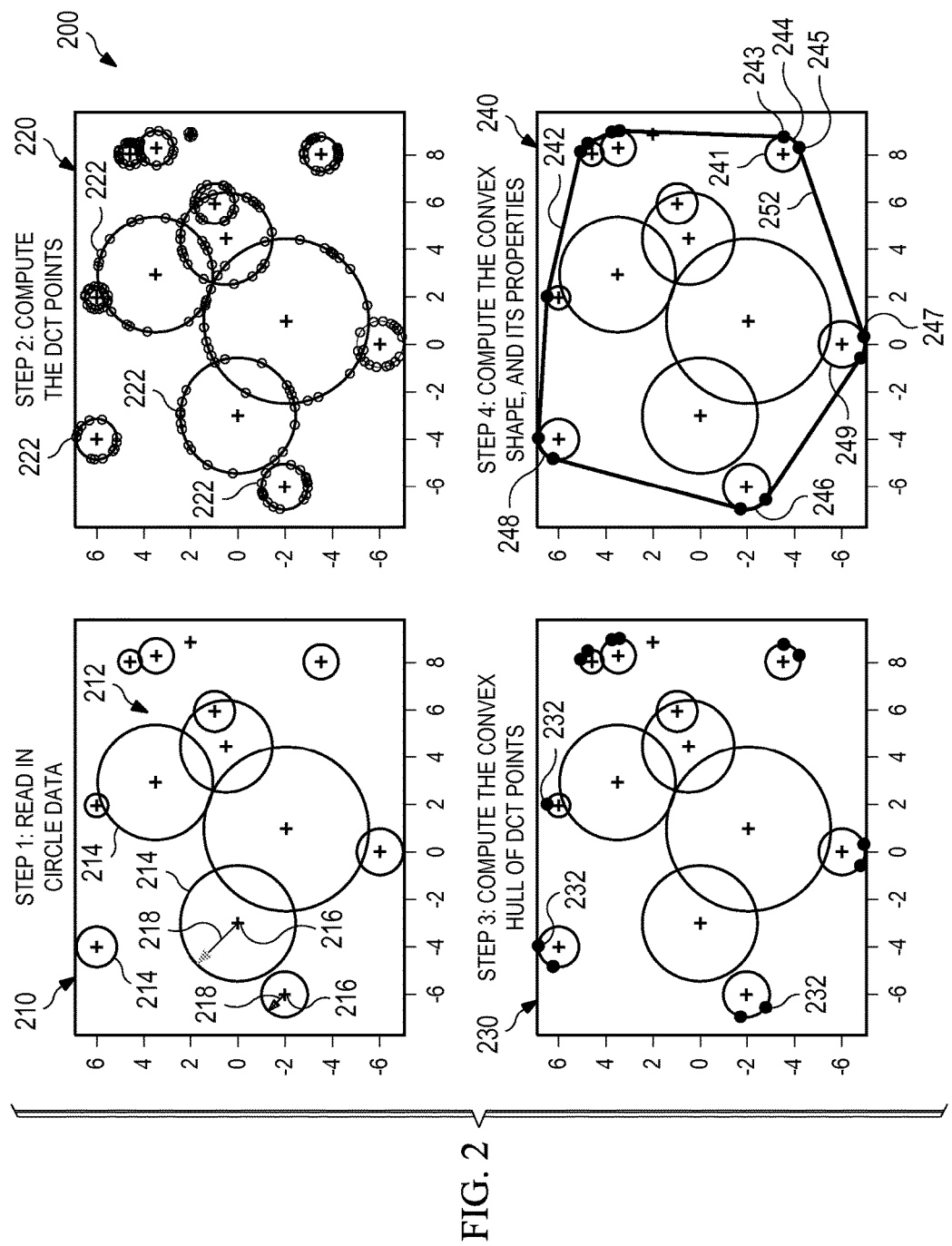
FIG. 2 is a diagram showing aspects of an example algorithm for computing a boundary of a set of planar circles.

FIG. 2 is a diagram showing aspects of an example algorithm 200 for computing a boundary of a set of planar circles. In the illustrate example of FIG. 2, the boundary includes a convex shape, and the set of geometrical objects are a set of planar circles. The boundary and the set of geometrical objects can have another type of geometry in other cases. For example, the geometrical objects can be ellipses or any other convex objects. The example algorithm 200 can be adapted to compute a boundary of a set of convex objects that include, for example, circles, ellipses, or a combination of these and other convex objects. All or part of the example algorithm 200 may be computer-implemented, for example, using the features and attributes of the example computing subsystem 110 shown in FIG. 1B or other computing systems. The algorithm 200, individual operations of the example algorithm 200, or groups of operations may be iterated or performed simultaneously to achieve a desired result. In some cases, the example algorithm 200 may include the same, additional, fewer, or different operations performed in the same or a different order. The example algorithm 200 may be performed on site near a wellbore, at a remote location, or in another location.

At a high level, the example algorithm 200 includes four steps: Steps I-IV (210-240). Step I (210) includes identifying circle data and user preferences; Step II (220) includes computing the direct common tangents (DCTs) for each pair of circles; Step III (230) includes computing a boundary (e.g., a convex hull) of DCT points; and Step IV (240) includes computing the convex shape, and identifying its properties. Detailed operations of each step are described below.

In some implementations, a microseismicity-supported SRV (e.g., an SRV computed using the locations of the microseismic events generated or induced by the stimulation treatment) can be identified. For instance, an SRV boundary can be calculated to enclose the locations of the microseismic events (e.g., represented by the centers 216 of circles 214 of FIG. 2); the volume or area enclosed by the SRV boundary can be identified as the microseismicity-supported SRV and is often a good approximation for the hydrocarbonate SRV for the stimulation treatment. The SRV boundary can be, for example, a convex hull or of another shape or a collection of shapes. Example techniques for computing an SRV boundary based on microseismic event data are described in U.S. patent application Ser. No. 13/975,985, filed on Aug. 26, 2013, entitled "Identifying a Simulated Reservoir Volume from Microseismic Data." Additional or different techniques can be used to compute an SRV boundary.

At step I (210), circle data 212 can be identified, for example, by reading from a memory of a computing system (e.g., the memory 150 of the computing subsystem 110 of FIG. 1B). The circle data 212 can include location, size, or other information of a set of circles 214. For example, the circle data 212 can include information of a center 216 and a radius 218 of each circle 214. The set of circles 214 can have the same or different sizes and locations. Two or more circles 214 may contact, intersect, overlap, be separated, or have another position relative to each other.

As an example application, each circle 214 can represent a location-uncertainty domain of a microseismic event data point. For instance, the center 216 of the circle 214 can represent a microseismic event data point while the radius 218 of the circle 214 can represent an uncertainty of the microseismic event data point. The uncertainty of the microseismic event data point can include, for example, errors introduced by the sensors or other measuring equipment, errors introduced by the signal interpretation or processing process, and other errors associated with the microseismic event data. In some implementations, the uncertainty or error of a microseismic event data point can be represented by a general convex shape around the center point of the microseismic event. For example, the microseismic event data point can represent a microseismic event location, and the microseismic event location can have azimuth uncertainty relative to an observation well, distance uncertainty relative to the observation well, depth uncertainty, or other types of uncertainty. The different types of uncertainty can have the same or different quantities. In some instances, three or more uncertainty quantities (e.g., event's azimuth uncertainty, distance uncertainty, and depth uncertainty) can be used to the constructed the location-uncertainty domain (e.g., the circle 214 or another geometrical object) of the microseismic event data point (e.g., the center 216). For example, the maximum, minimum, average or other statistical attributes of the uncertainty quantities may be used as the radius 218 of the circle 214, or some or all of the uncertainty quantities may be otherwise manipulated to obtain an area or a volume of the circle or another geometrical object that represents the location-uncertainty domain of the microseismic event data point.

For example, by representing the location-uncertainty domain as a circle 214, the radius 218 of the circle 214, denoted as r, may be derived by equation (1) or a variation thereof:

$$\pi r^2 = (\text{azimuth uncertainty}) * (\text{distance uncertainty}) \quad (1).$$

As another example, by representing the location-uncertainty domain as a 3D sphere with radius r, the radius of the sphere can be given by equation (2) or a variation thereof:

$$\frac{4}{3}\pi r^3 = \quad (2)$$

$$(\text{azimuth uncertainty}) * \ldots (\text{distance uncertainty}) * (\text{depth uncertainty}).$$

In some implementations, the radius 218 of the circle 214 can be obtained by projecting or otherwise transform the radius r of the sphere. Additional or different techniques can be used to describe and quantify the location-uncertainty domain of the microseismic event. In some implementations, the circle data can represent data other than the microseismic event data.

In some implementations, user preferences can be identified. The user preferences can specify, for example, a treatment of data degeneracy, a calculation precision tolerance, output data precision tolerance, or other information. The example algorithm 200 can be implemented to account for a variety of data degeneracy treatments, run-time tolerance, precision tolerance, and other factors.

A given data set is degenerate if the data points are not in general positions. For example, a data set is degenerate if two or more of its data points are coincident or collinear. The data precision can describe a relative error due to rounding in floating point arithmetic. The required precision in the output data can determine, for example, which sub-algorithm to use to robustly compute a convex hull in Step III (230) (in the context of the overall algorithm 200, sub-algorithms are algorithms that can be employed at each of Steps I-IV (210-240)).

Robustness can be an important issue in geometric algorithms, since small round-off errors in floating point operations can lead to large errors in the final result. For example, for convex hull calculations, difficulties can arise when multiple data points are very close to each other (e.g., the distance or difference is close to machine precision (e.g., $10^{-16}$)). In some instances, if such high accuracy is not required in the output, the very close points can be processed as being coincident to make the algorithm robust. Otherwise, non-robust geometric primitives can be avoided, which may increase the total run-time. As such, depending on the user's needs, the appropriate sub-algorithm can be chosen to compute the convex hull at Step III (230). For example, the user can specify that all the collinear points on the convex shape need to be accounted for, and require the results to be accurate to "d" decimal places. In this case, the sub-algorithms can then be chosen according to these user preferences, as discussed with respect to Step III (230).

Figure 3A:
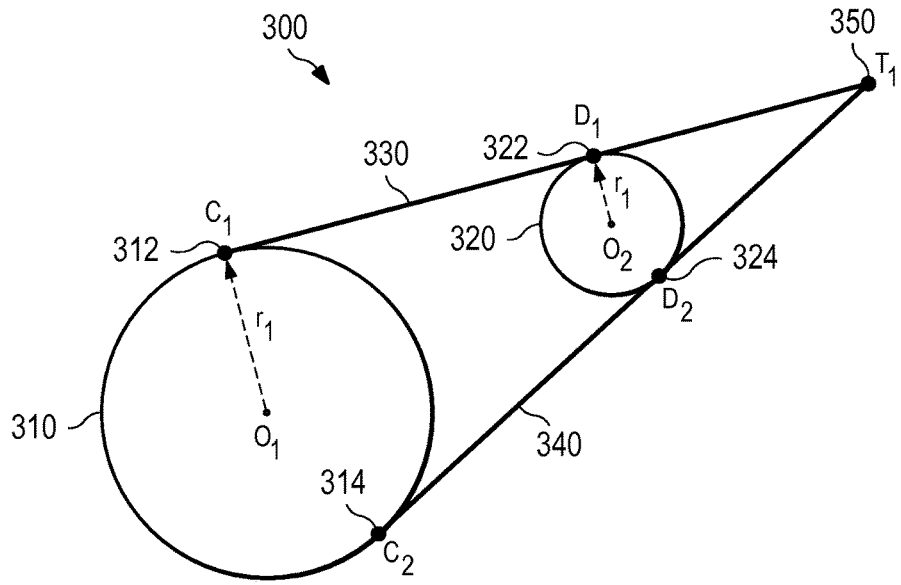
FIG. 3A is a diagram showing aspects of an example technique for calculating direct common tangent (DCT) points for a pair of circles in a general case.
Figure 3B:
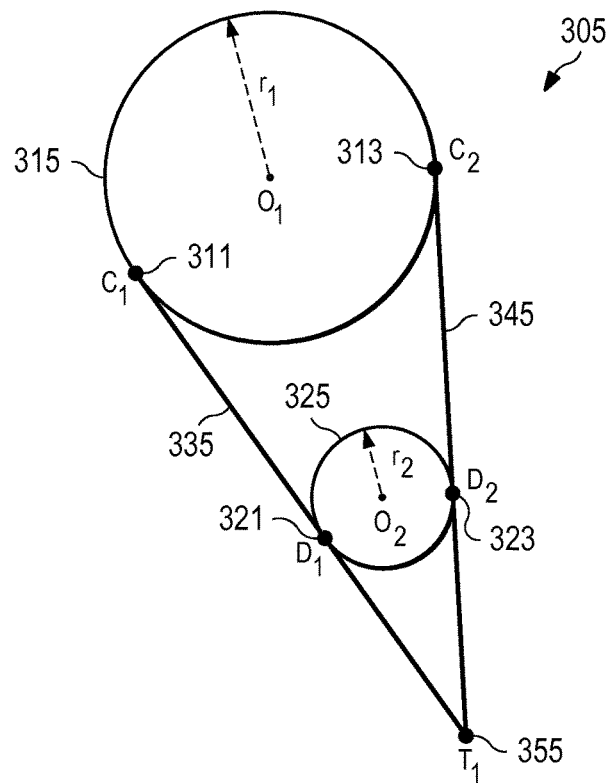
FIG. 3B is a diagram showing aspects of an example technique for calculating DCT points for a pair of circles in a special case where a tangent is vertical.

At Step II (220), direct common tangents (DCTs) to each pair of circles can be computed. A direct common tangent is a line that is tangent to each of two coplanar circles. If there are N circles, this step has a computational complexity of $O(N^2)$. In what follows, denote n~$O(N^2)$. At Step II (220), a list of DCTs can be created. The list of DCTs can include, for example, all identified DCTs for each pair of the circles 214. FIGS. 3A and 3B show example sub-algorithms for computing the DCT points of a pair of two circles.

FIG. 3A is a diagram 300 showing an example technique for calculating DCT points for a pair of circles in a general case (e.g., without data degeneracy) and two circles have unequal radii. For example, two circles 310 and 320 have radii $r_1$ and $r_2$ (ordered as $r_1 > r_2$ with centers at $O_1(O_{1x}, O_{1y})$ and $O_2$, $(O_{2x}, O_{2y})$, respectively. FIG. 3A also shows two DCTs 330 and 340 of the two circles 310 and 320. The intersection point $T_1$, $(T_{1x}, T_{1y})$, 350 of the two DCTs 330 and 340 can be computed by using similar triangles:

$$T_{1x} = \frac{r_1 O_{2x} - r_2 O_{1x}}{r_1 - r_2}; \tag{1}$$

$$T_{1y} = (r_1 O_{2y} - r_2 O_{1y})/(r_1 - r_2). \tag{2}$$

Let $C_1$, $(C_{1x}, C_{1y})$, 312 and $C_2$, $(C_{2x}, C_{2y})$, 314 denote the points of tangency on circle 1 310 (with radius $r_1$), and $D_1$, $(D_{1x}, D_{1y})$, 322 and $D_2$, $(D_{2x}, D_{2y})$, 324 denote the corresponding points of tangency on circle 2, 320. The perpendicular distance from the center of circle 1, $O_1$, to any of the tangent lines CD is $r_1$. If the slope of the line is denoted by m, then $$\frac{|(O_{1y} - T_{1y}) - m(O_{1x} - T_{1x})|}{\sqrt{1+m^2}} = r_1 \tag{3a}$$

$$\Rightarrow a_m m^2 + b_m m + c_m = 0 \tag{3b}$$

$$\Rightarrow m = \frac{-b_m \pm \sqrt{b_m^2 - 4 a_m c_m}}{2 a_m} \tag{3c}$$

Here, $$a_m = (O_{1x} - T_{1x})^2 - r_1^2, \tag{4}$$

$$b_m = -2(O_{1y} - T_{1y})(O_{1x} - T_{1x}), \tag{5}$$

$$c_m = (O_{1y} - T_{1y})^2 - r_1^2 \tag{5}$$

The two computed values of $m=(m_1, m_2)$ indicate the slopes of the two DCTs 330 and 340. Given the slope, the equation of the tangent with the circle can be solved to obtain the points of intersection (e.g., points of tangency $C_1$ 312, $C_2$ 314, $D_1$ 322, $D_2$ 324), for example, by formulae (7)-(10) (for j=1,2):

$$C_{jx} = -\frac{-2 O_{1x} - 2 m_j^2 T_{1x} + 2 m_j (T_{1y} - O_{1y})}{2(1+m_j^2)}, \tag{7}$$

$$C_{jy} = T_{1y} + m_j (C_{jx} - T_{1x}), \tag{8}$$

$$D_{jx} = -\frac{-2 O_{2x} - 2 m_j^2 T_{1x} + 2 m_j (T_{1y} - O_{2y})}{2(1+m_j^2)}, \tag{9}$$

$$D_{jy} = T_{1y} + m_j (D_{jx} - T_{1x}). \tag{10}$$

FIG. 3B is a diagram 305 showing an example technique for calculating DCT points for a pair of circles for the case where a tangent is vertical, i.e., $m \to \infty$. For example, FIG. 3B shows a DCT 345 is vertical, thus $m \to \infty$, which implies $a_m=0$, thus the slope of the non-vertical tangent line (e.g., 335) can be given by $$m = -c_m/b_m \tag{11}.$$

The points of tangency $C_1$ and $D_1$ can be computed using equations (7)-(10), followed by the computation of the angle, $\angle C_1 T_1 O_1$. If $C_2 D_2$ denotes the vertical tangent line 345, $\angle C_1 T_1 C_2 = 2 \angle C_1 T_1 O_1$. $C_2$ and $D_2$ can be computed by rotating $C_1$ and $D_1$ by $\alpha = \angle C_1 T_1 C_2$ in either clockwise (CW) or counter clockwise (CCW) direction. For CCW rotation, the points of intersection (e.g., points of tangency $C_1$ 311, $C_2$ 313, $D_1$ 321, $D_2$ 323) can be obtained, for example, by using equations (12)-(15) (for j=1,2):

$$C_{2x} = (C_{1x} - T_{1x})\cos(\alpha) - (C_{1y} - T_{1y})\sin(\alpha) + T_{1x}, \tag{12}$$

$$C_{2y} = (C_{1x} - T_{1x})\sin(\alpha) + (C_{1y} - T_{1y})\cos(\alpha) + T_{1y}, \tag{13}$$

$$D_{2x} = (D_{1x} - T_{1x})\cos(\alpha) - (D_{1y} - T_{1y})\sin(\alpha) + T_{1x}, \tag{14}$$

$$D_{2y} = (D_{1x} - T_{1x})\sin(\alpha) + (D_{1y} - T_{1y})\cos(\alpha) + T_{1y}. \tag{15}$$

In some implementations, two or more circles may fall into a degenerate case. One example of a degenerate case is where one circle is interior to the other. In this case, the points of tangency do not exist, and no points are added to the list of DCTs. Another example of a degenerate case is where two circles have equal radii ($r_1=r_2$), leading to several possible scenarios. For example, 1) when $O_{1x} \neq O_{2x}$; $O_{1y} \neq O_{2y}$, DCTs are mutually parallel and are parallel to the line of centers, and thus the slope of the DCT can be calculate by $$m = (O_{2y} - O_{1y})/(O_{2x} - O_{1x}). \tag{16}$$

The DCT points can be obtained from Equation (16), accordingly.

When 2) $O_{1x} = O_{2x}$, the points of intersection can be obtained, for example, based on Equations (17)-(20):

$$C_x = O_{1x} \pm r_1; \tag{17}$$

$$D_x = O_{2x} \pm r_2; \tag{18}$$

$$C_y = O_{1y}; \tag{19}$$

$$D_y = O_{2y}. \tag{20}$$

When 3) $O_{1y} = O_{2y}$, the points of intersection can be obtained, for example, based on Equations (21)-(24):

$$C_y = O_{1y} \pm r_1; \tag{21}$$

$$D_y = O_{2y} \pm r_2; \tag{22}$$

$$C_x = O_{1x}; \tag{23}$$

$$D_x = O_{2x}. \tag{24}$$

When 4) $r_1=r_2=0$, the points of intersection C and D are the circle centers. When 5) $O_1=O_2$, circles are considered interior to each other and no DCT points are added to the list.

At the end of Step II (220), the maximum number of the DCT points added in the list can be $n=2N(N-1)$. For practical data sets, there can be a large number of circles that are interior to others, and they can be eliminated from consideration. The diagram 220 shows example DCT points 222 of the circles 214 computed according to the example techniques described with respect to Step II (220).

At Step III (230), a boundary of the DCT points can be computed. After the DCT points (e.g., the DCT points 222 as shown in diagram 220) are obtained, a boundary enclosing these DCT points can be computed. In some instances, the boundary can be a convex hull that is the minimum convex shape that encompasses the DCT points. The boundary can have another shape or property. Step III (230) shows example algorithm for computing a convex hull of the DCT points 222 as shown in diagram 220. Various algorithms for computing a convex hull based on a set of points can be used to compute the convex hull of the DCT points. The decision of which algorithm to select can be based on the problem size (e.g., the number of circles included in the circle data), the user's requirement of accuracy, or other criteria. The overall run-time of the algorithm can be determined by the algorithm chosen in Step III (230), as discussed below. Three example algorithms are discussed hereafter. Additional or different algorithms can be used.

A first example algorithm for computing a convex hull based on a set of points is Robust Jarvis March algorithm (also referred to as the "output sensitive convex hull" algorithm). Let h denote the final number of points on the convex hull. This algorithm has a computational complexity of O(nh). The original version of Jarvis March algorithm is based on "three-point" comparisons. Geometric primitives based on three-point comparisons are in general less robust than those based on two-point comparisons. Thus, a Robust Jarvis March algorithm can be implemented using a Jarvis March algorithm based on two-point comparisons. In some instances, the Robust Jarvis March algorithm is selected when the user requires output results accurate up to machine precision. In some instances, faster alternatives described below can be used.

Although the Robust Jarvis March algorithm is more robust that other algorithms (e.g., Graham Scan algorithm and Chan's algorithm described below), its robustness cannot be mathematically guaranteed. Another approach can be used, in some cases, to mathematically guarantee robustness without adding the computational cost of arbitrary precision arithmetic. Robustness issues can be caused by finite precision computations, for example, when some calculation is contaminated by round-off errors. In these situations, instead of performing the calculations explicitly, all the possible outcomes of the calculation can be tracked. At the end, multiple solutions to the problem would be obtained and the difference between these solutions would indicate the loss of information incurred due to finite precision calculations. This method can provide an explicit quantification of the non-robustness in a geometric calculation and enables the use of fast algorithms even for calculations that are contaminated by round-off error without sacrificing correctness or convergence.

A second example algorithm for computing a convex hull based on a set of points is Graham Scan algorithm. The Graham Scan algorithm has a complexity of O(n log(n)) and is known to be faster than the Jarvis March algorithm in the worst case, as well as in practice when n is not too large. However, the Graham Scan algorithm is based on the orientation predicate, which indicates whether three points make a right turn, left turn, or stay collinear. This test is inherently non-robust, especially when the points diversify within a few machine precision units. Thus, some implementations of the Graham Scan algorithm can be used for speed-up only if the user does not require results accurate up to machine precision. For example, when the input data is only accurate to fewer decimal places than the machine accuracy, thus, the desired output accuracy can be no more than the input accuracy, and Graham Scan algorithm can be made robust, for example, by pre-processing its input data to be rounded to the needed number of decimal places.

A third example algorithm for computing convex hull based on a set of points is Chan's algorithm, which has a complexity of O(n log(h)). Chan's algorithm is an "output sensitive convex hull algorithm" that can be shown to have a theoretically optimal run-time. In some implementations, the algorithm can be the choice for large n. However, the original algorithm is less than optimal for most practical implementations. And despite its theoretically optimal run-time, no good implementation of Chan's algorithm was available. The example techniques described here provides an improved Chan's algorithm, which can run in O(10n) time (provided $h<2^{10}$, which is usually the practical case) and includes a practical implementation method that can achieve close to theoretical run-time for practical data sets. Techniques for dealing with the degenerate cases are included as well.

Figure 4:
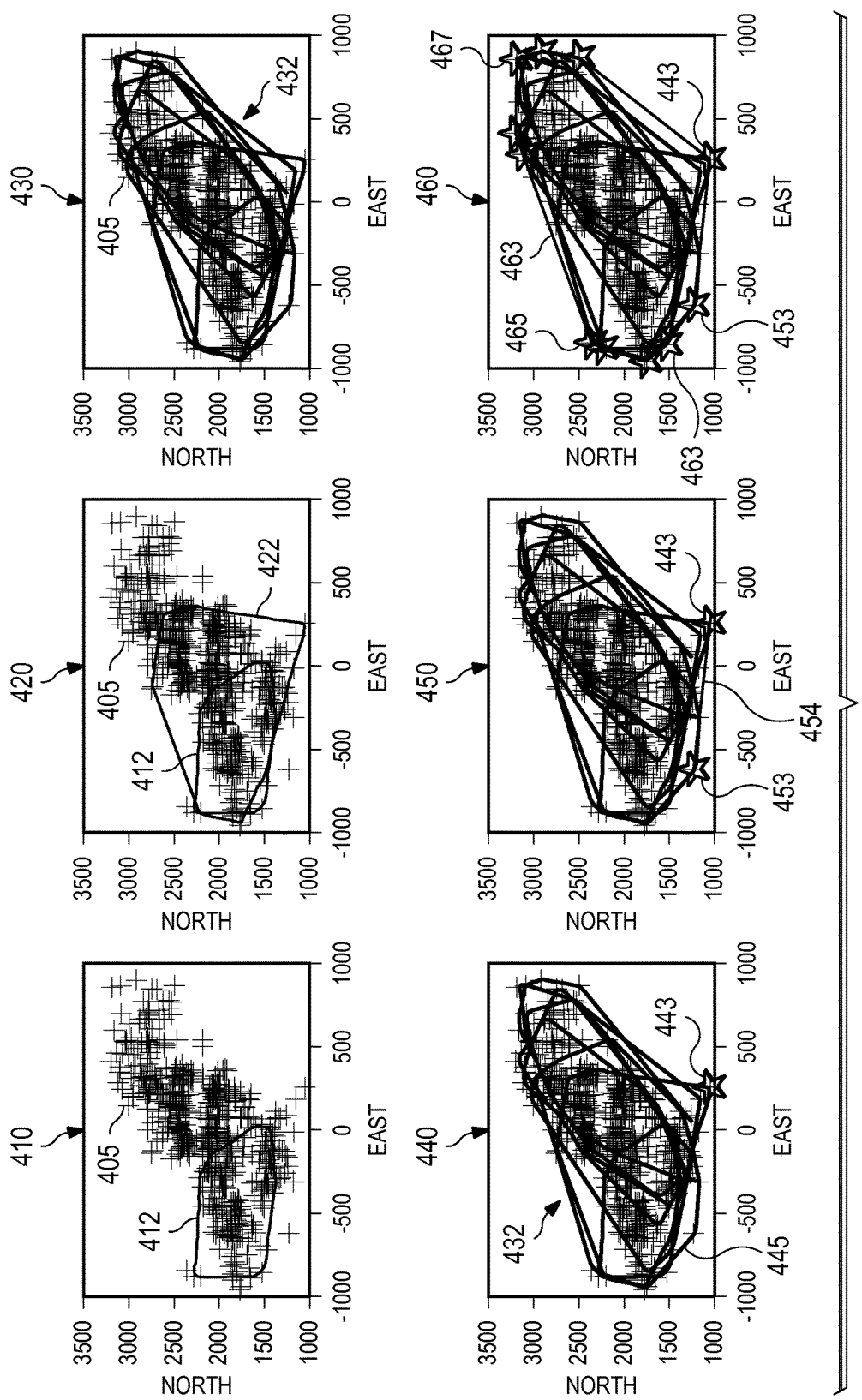
FIG. 4 is a set of diagrams showing example aspects of an improved Chan's algorithm for computing a convex hull based on a set of points.

FIG. 4 is a set of diagrams 410-460 showing example aspects of an improved Chan's algorithm for computing a convex hull based on a set of points (say, n points), which can be the DCT points (e.g., the DCT points 222 as shown in diagram 220) or other points. The improved Chan's algorithm can include four major steps. The diagrams 410-430 in the top row show construction of multiple sub-hulls based on multiple subsets of the set of n points. The diagrams 440-460 in the bottom row show points on a final convex hull (e.g., the points 453, 465, 467, etc. on the final convex hull 463, also referred to as final convex hull points) obtained one-by-one using a combination of an enhanced binary search method and Jarvis March algorithm. Operations in each of the four steps of the improved Chan's algorithm are described below.

At a first step, the set of n points can be divided into subsets of at most m points. Without loss of generality and for simplicity of presentation, it is assumed that n is exactly divisible by m, so that H=n/m subsets are under consideration. n can be indivisible by m. All the conclusions will hold for the general case where n is larger than m. In the illustrated example of diagram 410, the set of n points 405 are divided into multiple subsets, and the hull 412 enclosing an example subset of m points.

At a second step, the convex hull of each of these subsets of m points can be computed, for example, using a O(m log(m)) algorithm or another algorithm. For instance, the Graham Scan algorithm can be used for computing the convex hull of each subset of m points. The convex hull computed for each subset of points can be referred to as a sub-hull. The second step can produce H possibly intersecting sub-hulls. In the example of FIG. 4, the hull 412 in diagrams 410 and 420 is an example sub-hull of a first subset of points; the hull 422 in diagram 420 is another sub-hull of a second subset of points. Diagram 430 shows the multiple intersecting sub-hulls 432 computed based on the multiple subsets of points. In some instances, it is mathematically guaranteed that the final convex hull can be formed from points on these sub-hulls. Since the convex hull is an ordered set of points, CW or CCW ordering can be used. Without loss of generality, CW ordering is used throughout this disclosure.

At a third step, the lower right-most point in the set of sub-hulls can be identified. In some implementations, this point is guaranteed to be on the final convex hull. From this point (say $p_0$), the left tangent (LT) to each of the sub-hulls can be identified. Since the H sub-hulls are CW ordered points, an enhanced binary search method can be used to find the LT points. In some implementations, each application of the enhanced binary search method is in O(log(m)) time. In the example of FIG. 4, the diagram 440 shows the lower right-most point $p_0$ 443 of the set of sub-hulls 432 and a sub-hull 445; and diagram 450 shows the LT 454 from $p_0$ 443 to the LT point 453 on the sub-hull 445.

Figure 5:
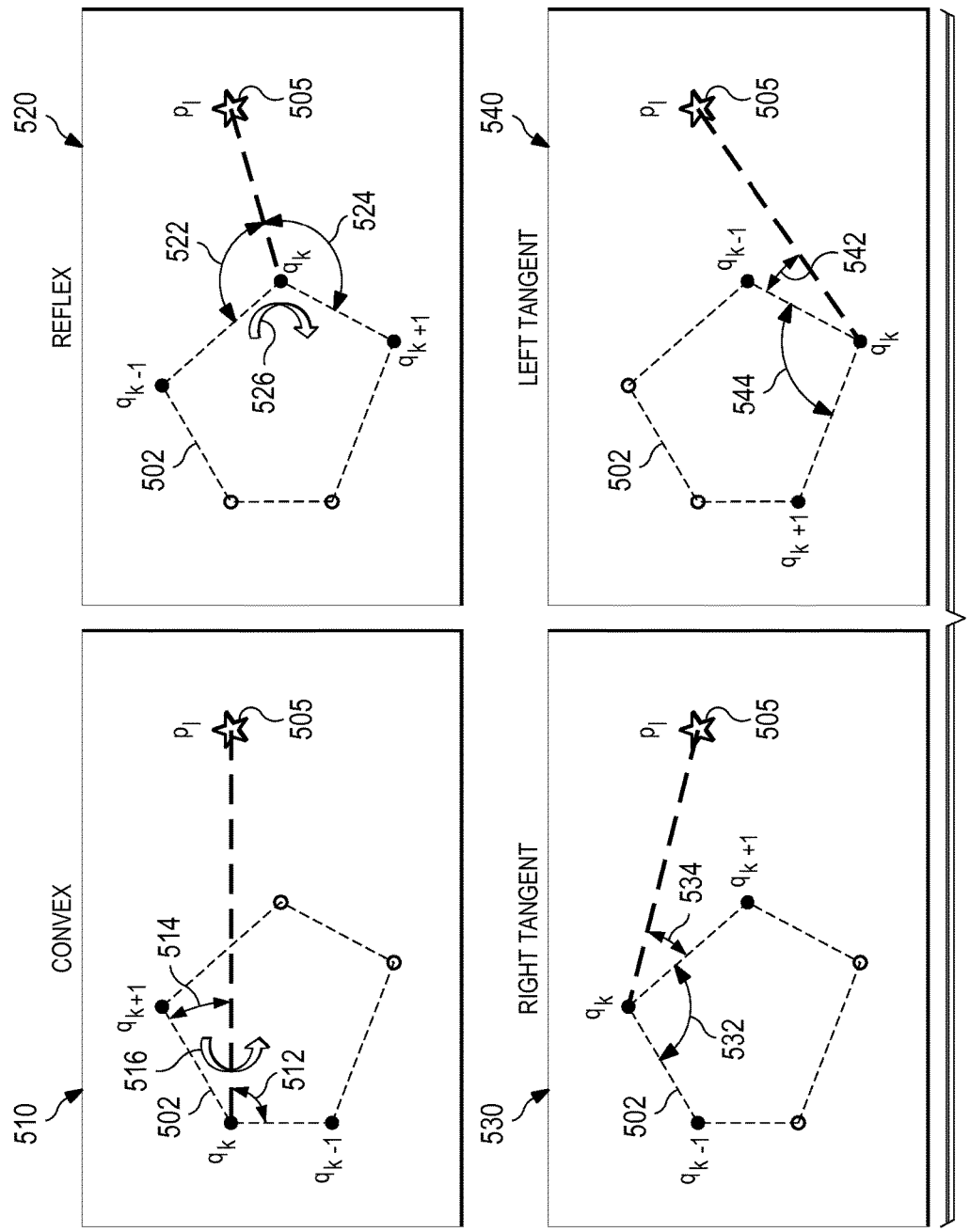
FIG. 5 includes a set of diagrams showing aspects of an example enhanced binary search method for identifying a left tangent from a point $p_l$ to a convex hull Q.

FIG. 5 includes a set of diagrams 510-540 showing aspects of an example enhanced binary search method for identifying a left tangent from a point $p_l$ 505 to a convex hull Q 502. The point $p_l$ 505 can be the latest identified point of the final convex hull (e.g., the lower right-most point $p_0$ 443). The convex hull Q 502 can be one of the sub-hulls 432 in FIG. 4 or it can be another convex hull. The arrows 516 and 526 indicate the direction of traversal in the binary search. When a right tangent is found, the example enhanced binary search procedure can continue in the direction determined by the previous point. The enhanced binary search procedure can stop when the left tangent is found. In some instances, three scenarios can be identified when querying a point (e.g., $q_k$) on a sub-hull (e.g., a convex hull 502) from a point $p_l$ (e.g., the lower right-most point $p_0$ of FIG. 4) to identify an LT point.

In a first scenario (e.g., as shown in diagrams 510 and 520), the trajectories $p_l q_k q_{k-1}$ and $p_l q_k q_{k+1}$ make opposite turns. For example, in diagram 510, the $\angle p_l q_k q_{k-1}$ 512 is in CW direction while $\angle p_l q_k q_{k+1}$ 514 is in the CCW direction. In diagram 510, the $\angle p_l q_k q_{k-1}$ 522 is in CCW direction while $\angle p_l q_k q_{k+1}$ 524 is in the CW direction. The point $q_k$ is convex if $\angle p_l q_k q_{k-1} + p_l q_k q_{k+1} \leq \pi$ (e.g., as shown in diagram 510), and reflex if $\angle p_l q_k q_{k-1} + p_l q_k q_{k+1} > \pi$ (e.g., as shown in diagram 520). If convex, the example enhanced binary search procedure can move CCW from $q_k$ to query a next point (e.g., $q_{k+1}$ in diagram 510 by repeating the example enhanced binary search procedure and treating $q_{k+1}$ as $q_k$), whereas if reflex, the algorithm moves CW from $q_k$ to query a next point (e.g., $q_{k+1}$ in diagram 520 by repeating the example enhanced binary search procedure and treating $q_{k+1}$ as $q_k$).

In a second scenario (e.g., as shown in diagram 530), both trajectories $p_l q_k q_{k-1}$ and $p_l q_k q_{k+1}$ make a left turn (e.g., in CW direction). Then the points are on the right tangent. The enhanced binary search procedure can move in the direction determined by querying the previous point (e.g., $q_{k-1}$). If this is the first point queried, then the direction to proceed can be arbitrarily chosen.

In a third scenario (e.g., as shown in diagram 540), both trajectories $p_l q_k q_{k-1}$ and $p_l q_k q_{k+1}$ make a right turn (e.g., in the CCW direction). Then the left tangent has been found and $q_k$ can be identified as the LT point to $p_l$, and the enhanced binary search procedure stops.

The optimality of the improved Chan's algorithm can rely on the enhanced binary search procedure, which, in some instances, is effective only in the absence of collinear points on the sub-hulls. If collinear points exist, then a special data structure for each sub-hull can be constructed. For example, the data structure can maintain two circular doubly linked lists for each sub-hull, one containing the entire sub-hull and another containing the sub-hull with its collinear points removed, while the start and end points of each collinear sequence are maintained using special arrays of pointers. As such, after the enhanced binary search to find the LT points is terminated, the data structure enables to use these collinear points again in the next step, if necessary.

At a fourth step of the improved Chan's algorithm, the final convex hull can be computed based on the identified LT points. For example, a next hull point $p_1$ (i.e., a point on the final convex hull) can be found by implementing the Jarvis March algorithm on the LT points with respect to $p_0$. For example, the Jarvis March can start from an extreme point $p_0$ (in this case, the bottom right-most point) and then calculate the point $p_1$ that makes the maximum angle with respect to $p_0$ (this calculation depends upon CW or CCW ordering, and also depends on whether two-point or three-point comparisons are used). With $p_1$ as the new reference, it computes $p_2$ in the same way. In this way, the algorithm computes all the convex hull points until $p_0$ is found again, which terminates the procedure. For example, as shown in diagram 460 FIG. 4, the LT 454 from $p_0$ 443 is the next hull point of a final convex hull 463 is constructed based on the identified LT points (e.g., the points 453, 465, 467, etc.) of the set of sub-hulls. In some implementations, it is important to check whether there is a need to insert any collinear points that were removed for the binary search in the third step. For example, in some instances, one or more of the collinear points may be closer to the $p_0$ 443 than other points in the sub-hull, and may be identified as the next hull point $p_1$.

After the next hull point $p_1$ (e.g., the LT point 454 in FIG. 4) is obtained, the third step of the improved Chan's algorithm can be repeated with $p_1$ as the new reference, and continued until the point $p_0$ (e.g., the point 443 in FIG. 4) is reached. As such, the final convex hull (e.g., the convex hull 463) based on the DCT points (e.g., DCT points 405) is established. In some implementations, additional or different techniques can be used to compute the final convex hull.

In some instances, the improved Chan's algorithm can be modified to include various features. For example, the Chan's algorithm relies on a good guess for m to achieve optimal run-time. In Chan's original algorithm, it is suggested to start with a small value of m and to keep iterating until m≥h, where h is the number of points on the convex hull. For practical implementations, it was suggested to geometrically increase the guess m until the condition is met. This strategy, however, can be less than optimal in some cases. The actual run-time for computing each of the H sub-hulls using, for example, Graham Scan algorithm (e.g., described above with respect to the second step of the improved Chan's algorithm) is O(m log(m)+$C_1$m), where $C_1$ is a small constant of O(1), and its exact value depends on the nature of the data set. Accordingly, when m is small, both terms contribute to the run-time. The second term can be neglected when m is sufficiently large. A safe value for practical data sets is found to be $\log(m)=10 \Rightarrow m=2^{10}$. This value is expected to be much greater than h, and hence an optimal run-time of O(10n) can be recovered. In some implementations, once a guess value is chosen, it can be more efficient to find the hull in one step, rather than to iterate.

In some instances, for the example algorithm 200, finding the convex hull from DCT points is the most time-consuming part. As such, optimizing this step can lead to faster execution time.

At Step IV (240) of the example algorithm 200, the boundary of the set of circles and its properties can be identified. The boundary can be computed using the convex hull computed based on the DCT points (e.g., the convex hull enclosing the DCT points 232). The convex hull can be computed, for example, according to the example techniques described with respect to Step III (230). The convex hull of the DCT points can offer a set of ordered points on the circles, which can be part of the boundary. In some implementations, the entire boundary (e.g., the boundary 242) can include arcs of the circles (e.g., the arcs 244, 246, 248) that would complete the boundary. In some implementations, two scenarios may arise in constructing the final boundary 242. In one scenario, consecutive points on the convex hull (e.g., the points 243 and 245) lie on the same circle (e.g., the circle 241). In this case, the appropriate arc (e.g., the arc 244) between the two points on the circle can be chosen to be part of the final boundary (e.g., the boundary 242). In another scenario, consecutive points on the convex hull (e.g., the points 245 and 247) lie on different circles (e.g., circles 241 and 249). In this case, whether the second point lies inside the circle containing the first point can be checked. For instance, whether the circle 249 that the point 247 lies on is inside the circle 241 that the point 245 lies on can be checked. If so, the second point can be discarded from the boundary (e.g., the boundary 242); otherwise, a line (e.g., the line 252) can be added to the boundary (e.g., the boundary 242).

In some implementations, after the boundary 242 is obtained, its geometric properties can be identified as output. The geometric properties can include, for example, area, volume, symmetry, and other properties.

The example techniques described above for computing a boundary of a set of geometrical objects have several applications. As an example implementation, the example techniques described above with respect to FIGS. 2-5 can be applied to microseismic event data with uncertainty.

Hydraulic fracturing has emerged as a powerful method to stimulate tight-oil and -gas reservoirs and enable economic production from them. Knowledge of stimulated reservoir properties, most commonly the stimulated reservoir volume (SRV), can be critical to estimate the amount of oil/gas trapped within the stimulated reservoir and to assess the efficacy of the stimulation at a certain stage. Microseismic events are generated during the hydraulic fracturing process, and can provide information regarding the extent of stimulation. These events are typically detected from nearby geophone sensor arrays. Measurement by these sensors incurs errors arising from various sources such as the velocity model, observation distance, ambient noise, etc. Therefore, the usual practice of using the mean positions of the recorded microseismic event data to compute the SRV may be in error. It would thus be useful, for example, if an operator can obtain a tight estimate of the error in the calculated SRV with little computational expense, which may provide additional guidance for optimizing the operation. Such information can also assist in better interpretation of the observed correlation between the SRV and the cumulative production from the well. The example techniques described herein can help provide an efficient and robust way to obtain an accurate estimate of the maximum positive error in the SRV calculation.

In some instances, microseismic event data with uncertainties can be obtained from field measurements. In the description that follows, the depth coordinate is omitted so that a two-dimensional projection of the data (and their uncertainty) on a depth plane is considered. The uncertainty of each data point can be represented by a circle with a radius determined based on the example techniques described with respect to FIG. 2 and Equations (1) and (2). In some implementations, when a tight bound on the maximum positive error is considered, the radius can be determined to be equal to the maximum error in their measurement.

Each circle can represent the domain within which the data point may be expected to lie, for example, due to its measurement uncertainty. A boundary of a set of circles can be efficiently and robustly computed, for example, according to the example techniques described with respect to FIGS. 2-5. The area enclosed by the boundary can represent the maximum SRV that is permitted by the data, accounting for the uncertainties. In some instances, the boundary of the set of circles can be a convex shape that is the minimum convex curve that encompasses all of the circles.

In some implementations, microseismic data are typically given correct up to a certain accuracy (for the examples considered in this disclosure, microseismic data are accurate up to six decimal places), rarely requiring accuracy in the output that is close to machine precision. As such, computation of the convex hull of the DCT points can be implemented, for example, by rounding the input DCT points to six decimal places, which helps eliminate the robustness issues of Chan's algorithm or Graham Scan that can arise when multiple data points lie close to machine precision. In some instances, if higher accuracy is required, the example algorithm can switch to convex hull calculation using a Robust Jarvis March algorithm or another robust algorithm.

In some implementations, once the boundary of the set of circles is obtained for the microseismic events, its area can be calculated, which can give an estimate of the maximum SRV. For example, the area of the convex shape boundary $A_{CS}$ can be computed as follows:

$$SRV_{max} = A_{CS} = A_{CH} + A_{arc} \tag{25}$$

Here $A_{CH}$ is the area of the convex hull formed by the DCT points, and $A_{arc}$ is the additional area in the convex shape due to the circular arcs. In some implementations, the area of the boundary (i.e., $SRV_{max}$) can be compared with the mean SRV to get a tight bound on the maximum positive error, defined as $$E_{max} = \frac{SRV_{max} - SRV_{mean}}{SRV_{mean}}. \tag{26}$$

Figure 6A:
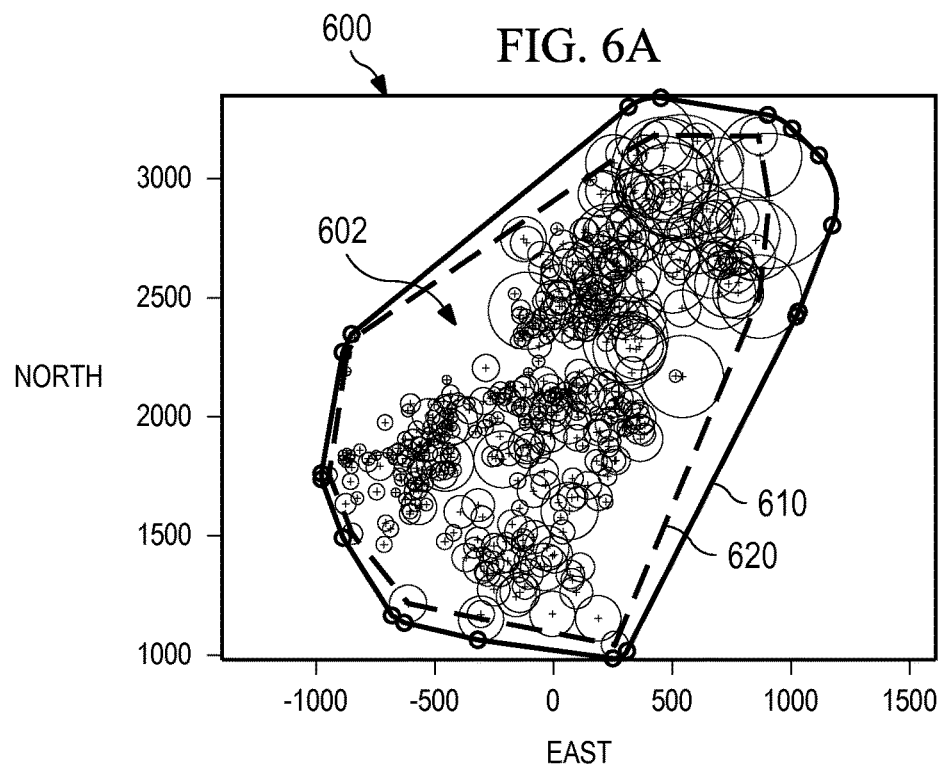
FIG. 6A-B are diagrams showing example boundaries computed based on microseismic data of a multi-stage stimulation treatment.
Figure 6B:
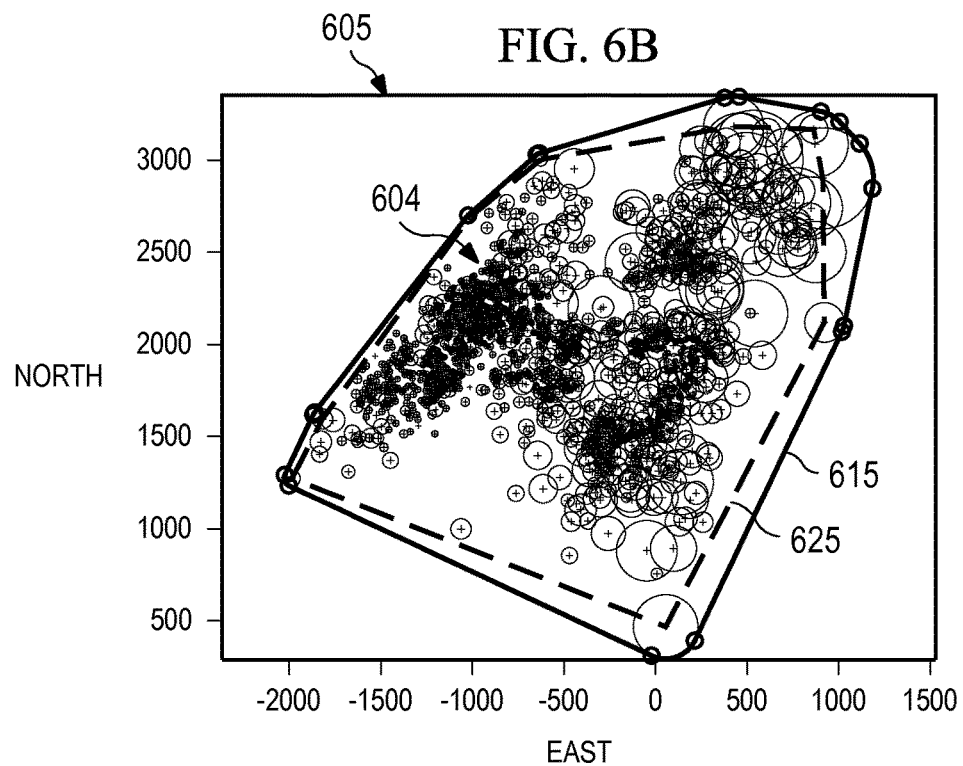

FIG. 6A-6B are diagrams 600 and 605 showing example boundaries computed based on microseismic data of a multi-stage stimulation treatment. The example boundaries are computed according to the example techniques described with respect to FIGS. 2-5. FIG. 6A shows data 602 taken from a single stage (Stage 3) of the four-stage stimulation treatment, whereas FIG. 6B shows the combined data 604 from four stages. The mean positions or locations of the data are shown by plus symbols, and the circle around each plus symbol represents the location-uncertainty domain of each data point. The radius of the circle can be, for example, the maximum uncertainty of the data point. The dotted curves 620 and 625 represent the mean convex hull, while the solid curves 615 and 625 are the convex shapes enclosing the microseismic circle data 602 and 604, respectively. For the two cases shown here, the maximum positive errors (e.g., computed according to Equation (26)) are about 26% and 20% respectively. Substantial errors in predicting the SRV can exist if the uncertainty in the microseismic data is not taken into account.

Figure 7:
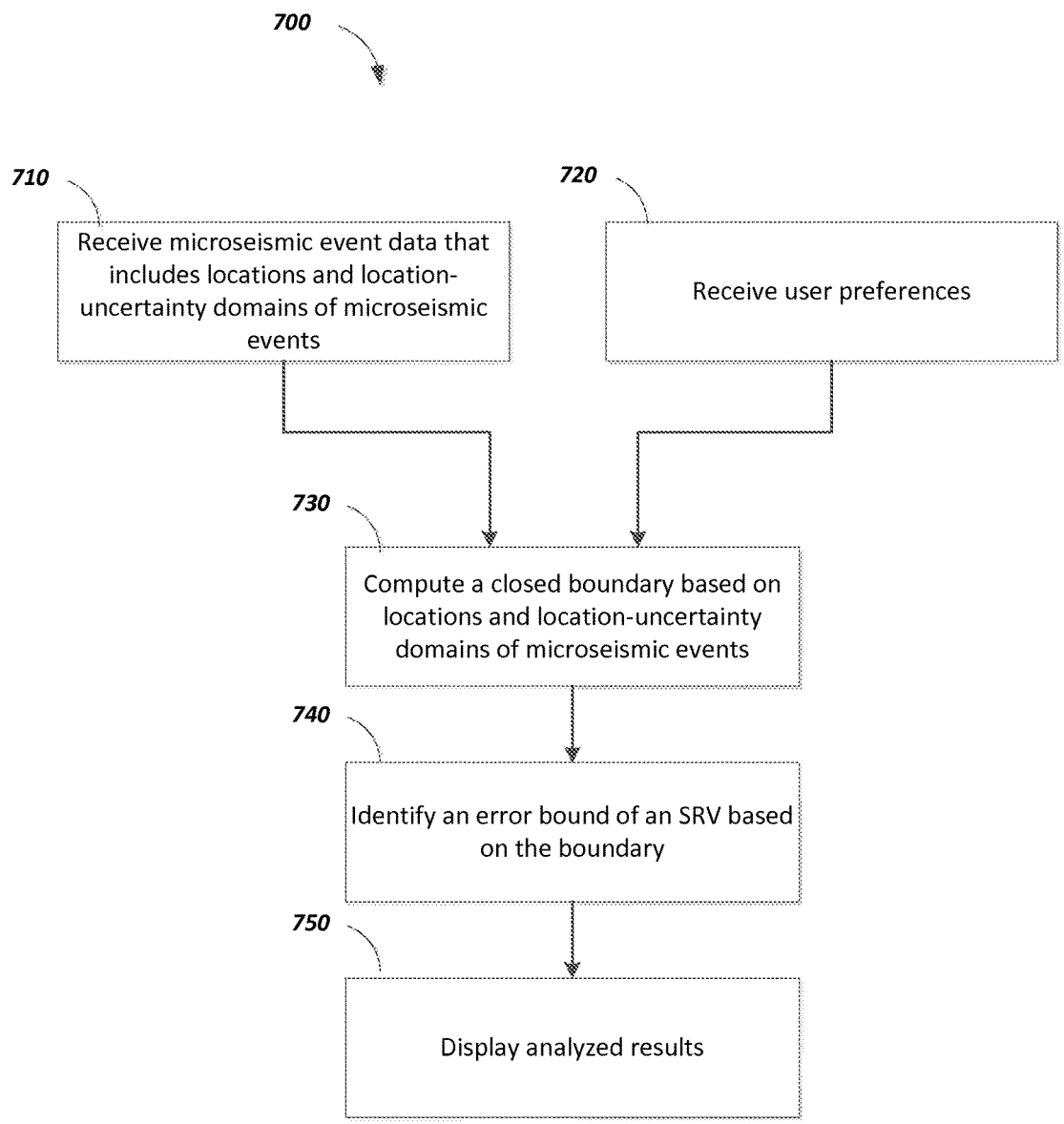
FIG. 7 is a flow chart showing an example technique for identifying an error bound of a stimulated reservoir volume (SRV) of a subterranean region.

FIG. 7 is a flow chart showing an example process 700 for identifying an error bound of a stimulated reservoir volume (SRV) of a subterranean region. All or part of the example process 700 may be computer-implemented, for example, using the features and attributes of the example computing subsystem 110 shown in FIG. 1B or other computing systems. The process 700, individual operations of the process 700, or groups of operations may be iterated or performed simultaneously to achieve a desired result. In some cases, the process 700 may include the same, additional, fewer, or different operations performed in the same or a different order. The process 700 may be performed on site near a wellbore, at a remote location, or in another location.

At 710, microseismic data can be received. The microseismic data can be collected, for example, by sensors (e.g., sensors 136 in FIG. 1A) or data collection apparatus of an injection treatment system. The microseismic data can be received before, during, or after a stimulation treatment or at another time. In some implementations, the microseismic event data can be collected in real time (or substantially in real time) during a stimulation treatment. In some implementations, the microseismic data can be stored in a memory of a computing system (e.g., memory 150 of the computing subsystem 110 of FIG. 1B) for storage or further processing; and the microseismic data can be received by reading from the memory of the computing system.

In some instances, microseismic events may have low-amplitude or low-energy (e.g., with the value of the log of the intensity or moment magnitude of less than three), or a low signal-to-noise ratio (SNR). Some uncertainty (including inaccuracy, measurement errors, processing errors or other errors) can be associated with the event locations. For example, the uncertainty can include a location (e.g., distance, azimuth, depth) uncertainty, a moment (e.g., amplitude or energy) uncertainty, a time uncertainty (e.g., the uncertainty related to associating an event with a particular treatment stage), or a combination of these and other types of uncertainty.

The microseismic data can include locations, uncertainties, times, magnitude, moment, energy, density, or a combination of these and other information of the microseismic events associated with a stimulation treatment of a subterranean region. In some implementations, the microseismic data can include a set of microseismic event data points. Each microseismic event data point can include respective location, uncertainty, or other information. For example, each microseismic event data point can be presented by a geometrical object (e.g., a circle 214 as described with respect to FIG. 2, a sphere as described with respect to Equation (2), an ellipse, an ellipsoid, etc.). The center or another point of the geometrical object can represent the location of the microseismic event while the boundary of the geometrical object can represent a location-uncertainty domain of the microseismic event. As an example, the microseismic data can include the circle data 212 described with respect to FIG. 2. The circle data can include a set of circles each having a center representing, for example, an average location of a microseismic event and a radius representing, for example, the maximum uncertainty of the measurement of the microseismic event. In some implementations, the location-uncertainty domain of the microseismic event data point can be represented by another geometrical object (e.g., a triangle, a cylinder, etc.) and may have more than one radius or spatial extent (e.g., an ellipse, an ellipsoid, etc.). Additional or different information and representation can be used to describe and quantify the location and location-uncertainty domain of the microseismic event.

At 720, user preferences can be received. In some implementations, the user preferences can, for example, be received from one or more input/output device of a computing system (e.g., input/output devices coupled to the input/output controller 170 of the computing subsystem 110 of FIG. 1B), or from reading a memory of a computing system (e.g., the memory 150 of the computing subsystem 110 of FIG. 1B). The user preferences can indicate one or more of, for example, a calculation precision tolerance, an output data precision (e.g., in terms of number of decimal places, data types, etc.), a desired treatment of degenerate data points (e.g., whether and how to account collinear or coincident points), or other information. In some implementations, the user preferences can include the user preference information described with respect to FIG. 2. The user preferences can include additional or different information.

In some implementations, one or more of a default calculation precision, or a default output data precision, a default treatment of data degeneracy, or other default settings can be configured or otherwise determined, with or without the user's input. For example, the default calculation precision can be determined to be the same or higher than the output data precision; or the default calculation precision and output data precision can be determined to be equal to, lower than or higher than the precision of the microseismic event data. In some implementations, a specific precision value (e.g., the machine precision or 6 decimal places) can be configured by the user or automatically determined. The default treatment of data degeneracy can be configured, for example, to account for none, partial, or all collinear and coincident data points. Additional or different user preferences can be configured.

At 730, a closed boundary can be identified based on locations and uncertainties of microseismic event data. The boundary can enclose the locations and respective location-uncertainty domains of the set of microseismic event data points in the microseismic event data. The closed boundary can be computed such that it defines the smallest-possible area that contains, within the closed boundary, all of the locations and location-uncertainty domains. In some cases, sections of the closed boundary coincide with the boundary of one or more of the location-uncertainty domains. In some instances, each of the location-uncertainty domains of the plurality of microseismic event data points can be represented by a geometrical object having one or more radii from the location of the microseismic event data point. For instance, the geometrical object can include, for example, a circle 214 as described with respect to FIG. 2, or any other object.

In some implementations, the closed boundary can be identified, for example, based on the example techniques described with respect to FIGS. 2-6. In some instances, computing the closed boundary can include identifying a second set of points that reside on the boundaries of the location-uncertainty domains, and computing a convex hull based on the second set of points. The convex hull can be a closed boundary intersecting the second set of points. For example, the second set of points can include the direct common tangent (DCT) points computed according to the example techniques described with respect to FIG. 2 and FIGS. 3A-3B. The convex hull can include, for example, a convex hull (e.g., the convex hull 463 of FIG. 4) or any other shape that connects the identified DCT points. The closed boundary can be obtained based on the convex hull. For example, the closed boundary can be a convex shape that includes the convex hull with additional arcs (e.g., the convex shape 242 in FIG. 2), or the closed boundary can be the same as the convex hull (e.g., the convex hull 463 of FIG. 4) or another shape.

Various algorithms can be used to compute the convex hull based on the second set of points. In some implementations, the algorithm for such a computation can be selected, for example, according to user preferences (e.g., a data precision requirement). For example, Robust Jarvis March algorithm can be selected, if the robustness requirement or output data precision requirement is high (e.g., around machine precision of $10^{-16}$). On the other hand, Chan's algorithm, Graham Scan algorithm, or variations thereof can be selected if the robustness requirement or the output data precision requirement is low (e.g., precision tolerance significantly larger than machine precision). In some implementations, the algorithm can be selected, for example, to achieve a desired tradeoff between the run-time tolerance and the robustness tolerance. For example, among the three example algorithms, the Chan's algorithm and its variant can be the fastest, especially for a large number of data points; the Graham Scan algorithm and its variant thereof can be the second fastest algorithm in run-time and can be used when the number of data points is relative small; the Jarvis March algorithm and its variant can be the most robust and can be chosen when the precision tolerance is high, at the cost of more run-time. Additional or different algorithms can be selected to compute the convex hull based on the second set of points.

In some implementations, the convex hull can be computed based on the second set of points, for example, according to the example improved Chan's algorithm described with respect to FIGS. 4 and 5. For example, the algorithm can include identifying subsets of the second set of points (e.g., by dividing a set of n points into H subsets); and computing sub-boundaries (e.g., sub-hulls 432 or other shape) based on the subsets of the second set of points (e.g., according to the Graham Scan algorithm or other algorithms). The algorithm can further include identifying a first reference point (e.g., the lower right-most point $p_0$ 443 of FIG. 4, the point $p_l$ 505 of FIG. 5, etc.) on the sub-boundaries; and performing a binary search procedure for identifying a left tangent (LT) point from the first reference point on each of the sub-boundaries, for example, in logarithmical time, including accounting for collinear points according to the example techniques described with respect to FIG. 5. After identifying all the LT points from the first reference point on the sub-boundaries, a second reference point (e.g., point 453) can be identified based on the LT points. In some implementations, the second reference point can be a next point residing on the convex hull. The binary search procedure can be repeated to identify the LT points from the second reference point on each of the sub-boundaries and identify a third reference point that resides on the convex hull from the LT points from the second reference point. The above procedure can be repeated until the first reference point is reached. The convex hull can be constructed based on the first reference point, the second reference point, etc., for example, including accounting for the collinear points, according to the example techniques described with respect to the fourth step of the improved Chan's algorithm with respect to FIG. 5 or in another manner.

The closed boundary can then be computed based on the convex hull, for example, by identifying and adding appropriate arcs that connect two or more vertices of the convex hull according to the example techniques described with respect to Step IV (240) of FIG. 2 or in another manner. In some instances, the closed boundary can be the same as the convex hull or include another variation of the convex hull.

In some implementations, degenerate microseismic event data points can be treated, for example, based on the user preferences. Example techniques for treating degenerate data points are described with respect to Step II (220) and Step III (230) of FIG. 2. As such, the example process 700 can be applied to any dataset "as is" by explicitly treating the degenerate data points. In some instances, additional or different techniques (e.g., filtering out the degenerate data from the data set) can be used to treat data degeneracy.

At 740, an error bound of a stimulated reservoir volume (SRV) for the stimulation treatment can be identified based on the boundary, for example, by computing the area or other properties of the boundary. For example, the error bound can include the maximum positive error in the SRV calculation, and can be computed, for example, according to Equation (26) or in another manner.

At 750, the analyzed result can be displayed. The analyzed result can include, for example, a geometrical representation of the microseismic event data and the uncertainties, the calculated SRV, the identified error bound, or a combination of these and other types of visualizations. In some implementations, the analyzed result can be displayed on a screen or another type of display apparatus. In some implementations, the analyzed result can be displayed, for example, in real time (or substantially real time) as the microseismic data are analyzed, after a final result is obtained, or at another time (e.g., when requested by a user). FIGS. 2, 4 and 6 show example displays of analyzed results. Based on the displayed result, efficiency of a stimulation treatment, and accuracy and reliability of the SRV calculation can be evaluated. In some instances, a current or a prospective injection plan (e.g., injection schedules of future treatment stages, parameters of injection treatment, diversion techniques, etc.) can be adjusted based on the result.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Various modifications can be made without departing from the scope of the present disclosure. Accordingly, other embodiments are within the scope of the following claims.

What is claimed is:

1. A method comprising:
   computing, by operation of a computer system, a closed boundary based on locations and respective location-uncertainty domains of microseismic events associated with a stimulation treatment of a subterranean region, the closed boundary enclosing the locations and location-uncertainty domains, wherein computing the closed boundary comprises:
      identifying boundary points on an uncertainty boundary of each location-uncertainty domain; and
      computing a convex hull based on the boundary points;
   identifying an error bound of a stimulated reservoir volume (SRV) for the stimulation treatment based on the closed boundary; and
   assessing stimulation treatment field development, evaluating efficiency of the stimulation treatment, modifying, and managing a plan for the stimulation treatment plan using the closed boundary.

2. The method of claim 1, wherein each of the location-uncertainty domains is represented as a radius associated with one of the respective locations.

3. The method of claim 2, wherein each of the location-uncertainty domains comprises a circle centered about one of the respective locations.

4. The method of claim 1, wherein computing the closed boundary comprises identifying one or more of the microseismic events as a degenerate microseismic event.

5. The method of claim 1, wherein computing the closed boundary comprises identifying one or more arcs connecting vertices of the convex hull.

6. The method of claim 1, comprising computing the convex hull according to an algorithm selected by a user.

7. The method of claim 1, comprising computing the convex hull according to an algorithm that is selected based on at least one of:
   a computational precision tolerance for identifying the error bound; or
   a run-time tolerance for identifying the error bound.

8. The method of claim 1, wherein identifying the boundary points comprises identifying direct common tangent (DCT) points.

9. The method of claim 1, wherein computing the convex hull comprises performing a binary search of a left tangent point from a reference point on each sub-boundary that encloses a respective subset of the boundary points.

10. The method of claim 1, wherein computing the convex hull comprises:
    identifying subsets of the boundary points;
    computing sub-boundaries based on the subsets;
    identifying a first reference point on each of the sub-boundaries;
    identifying a left tangent point from the first reference point on each of the sub-boundaries in logarithmic time;
    identifying a second reference point based on the left tangent points; and
    computing the convex hull based on the first reference point and the second reference point.

11. The method of claim 10, wherein identifying a left tangent point from the first reference point on each of the sub-boundaries comprises accounting for collinear points;

and computing the convex hull based on the first reference point and the second reference point comprises accounting for the collinear points.

12. The method of claim 1, wherein the SRV is computed based on the locations of the microseismic events, and identifying the error bound comprises identifying the maximum positive error of the SRV.

13. A non-transitory computer-readable medium storing instructions that, when executed by data processing apparatus, cause the data processing apparatus to perform operations comprising:
- computing a closed boundary based on locations and respective location-uncertainty domains of microseismic events associated with a stimulation treatment of a subterranean region, the boundary enclosing the locations and location-uncertainty domains, wherein computing the closed boundary comprises:
  - identifying boundary points on an uncertainty boundary of each location-uncertainty domain; and
  - computing a convex hull based on the boundary points;
- identifying an error bound of a stimulated reservoir volume (SRV) for the stimulation treatment based on the closed boundary; and
- assessing stimulation treatment field development, evaluating efficiency of the stimulation treatment, modifying, and managing a plan for the stimulation treatment plan using the closed boundary.

14. The computer-readable medium of claim 13, wherein each of the location-uncertainty domains is represented as a radius associated with one of the respective locations.

15. The computer-readable medium of claim 13, wherein identifying the boundary points comprises identifying direct common tangent (DCT) points.

16. The computer-readable medium of claim 13, wherein the SRV is computed based on the locations of the microseismic events, and identifying the error bound comprises identifying the maximum positive error of the SRV.

17. A computing system comprising:
- data processing apparatus; and
- memory storing computer-readable instructions that, when executed by the data processing apparatus, cause the data processing apparatus to perform operations comprising:
  - computing a closed boundary based on locations and respective location-uncertainty domains of microseismic events associated with a stimulation treatment of a subterranean region, the closed boundary enclosing the locations and location-uncertainty domains, wherein computing the closed boundary comprises:
    - identifying boundary points on an uncertainty boundary of each location-uncertainty domain; and
    - computing a convex hull based on the boundary points; and
  - identifying an error bound of a stimulated reservoir volume (SRV) for the stimulation treatment based on the closed boundary; and
  - assessing stimulation treatment field development, evaluating efficiency of the stimulation treatment, modifying, and managing a plan for the stimulation treatment plan using the closed boundary.

18. The computing system of claim 17, wherein each of the location-uncertainty domains is represented as a radius associated with one of the respective locations.

19. The computing system of claim 17, wherein identifying the boundary points comprises identifying direct common tangent (DCT) points.

* * * * *

UNITED STATES PATENT AND TRADEMARK OFFICE
CERTIFICATE OF CORRECTION

PATENT NO. : 10,310,114 B2
APPLICATION NO. : 15/304990
DATED : June 4, 2019
INVENTOR(S) : Ray et al.

Page 1 of 1

It is certified that error appears in the above-identified patent and that said Letters Patent is hereby corrected as shown below:

In the Specification

In Column 11, Line 38 approximately, after --$c_m = (O_{1y} - T_{1y})^2 - r_1^2$-- delete "(5)" and insert --(6).--

In Column 18, Line 16 approximately, delete "$SRV_{max} - A_{CS} - A_{CH} + A_{arc}$" and insert --$SRV_{max} = A_{CS} = A_{CH} + A_{arc}$--

In the Claims

Column 26, Line 20, after --points;-- delete "and"

Signed and Sealed this
Seventeenth Day of March, 2020

Andrei Iancu
*Director of the United States Patent and Trademark Office*